UNITED STATES PATENT OFFICE.

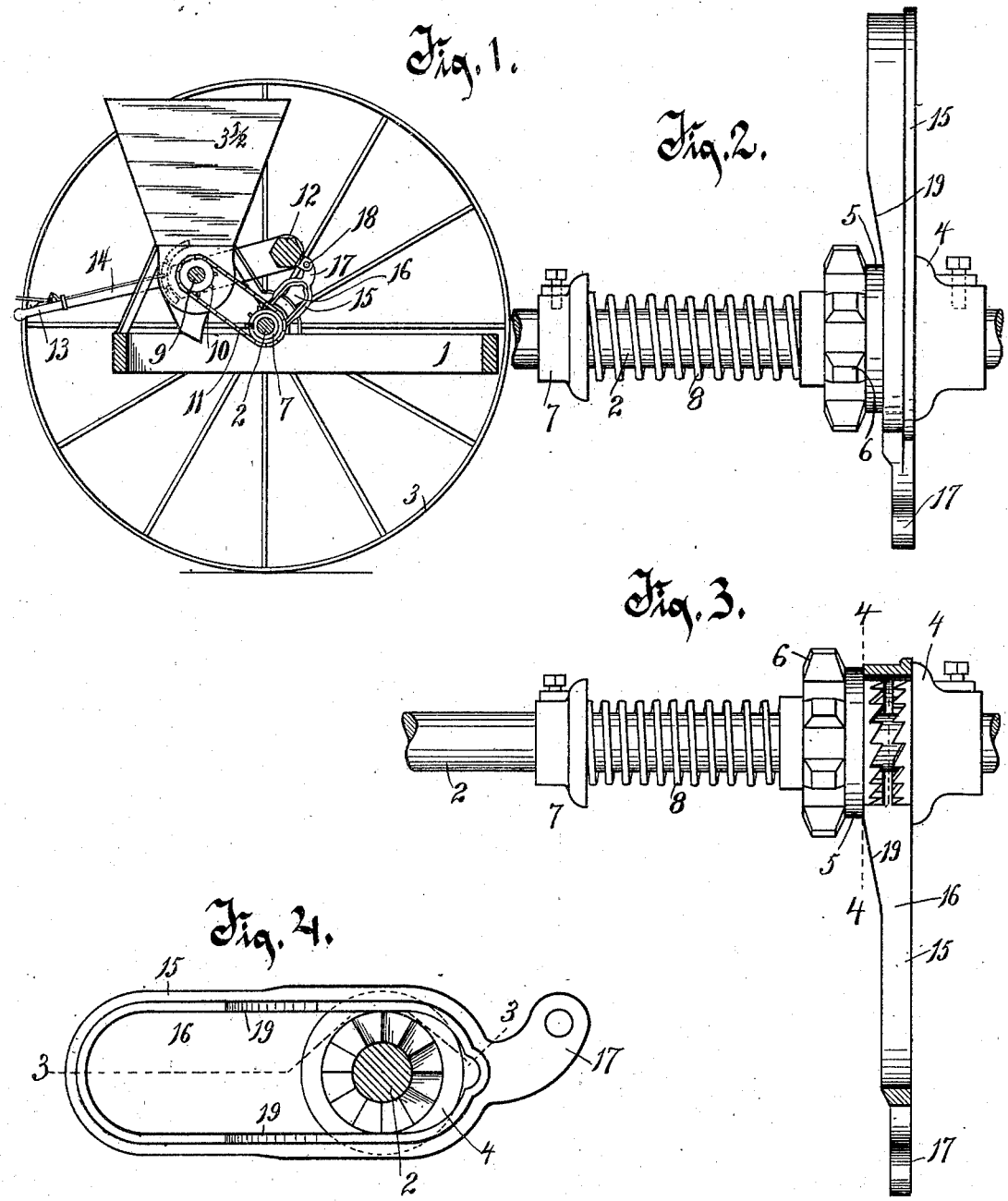

SAMUEL W. ROWELL, OF BEAVER DAM, WISCONSIN.

GRAIN-DRILL.

SPECIFICATION forming part of Letters Patent No. 502,468, dated August 1, 1893.

Application filed April 11, 1893. Serial No. 469,876. (No model.)

*To all whom it may concern:*

Be it known that I, SAMUEL W. ROWELL, of Beaver Dam, in the county of Dodge and State of Wisconsin, have invented a new and useful Improvement in Grain-Drills or Seeders and Like Machines, of which the following is a description, reference being had to the accompanying drawings, which are a part of this specification.

My invention has relation to improvements in grain drills or seeders, and like agricultural implements.

The primary object of the invention is to provide for cutting off the feed of seed simultaneously with the elevation of the shares or plows.

To carry out the above object, the invention consists in the improved construction as hereinafter more fully set forth.

In the accompanying drawings, Figure 1, is a longitudinal vertical section of a seed drill embodying my improvements. Fig. 2, is an elevation of the main drive shaft and parts carried thereby. Fig. 3, is a sectional view on the line 3—3 of Fig. 4, showing the clutches out of mesh, and Fig. 4, is a transverse section of Fig. 3 on the line 4—4 of the latter figure.

Like numerals of reference denote like parts throughout the several views.

Referring to the drawings, the numeral 1 indicates the frame of the machine, in which is journaled the main axle 2, carrying the wheels 3, 3. Above the main axle, and to the rear of the same, is located the seed-box or hopper 3½. The axle 2 carries rigidly, near one end, a clutch head 4, with which a second clutch head 5 is adapted normally to mesh. This latter clutch head is formed peripherally into a sprocket wheel 6. Interposed between the outer side of the clutch head 5 and a fixed collar 7 is a coiled spring 8, which normally holds the two sections of clutches in engagement.

Passing longitudinally through the bottom of the seed box or hopper 3½ is the usual feeding cylinder shaft 9, carrying a sprocket wheel 10, which is connected with the sprocket wheel on the clutch head 5 by a sprocket chain 11.

Running transversely of the machine, in front of the seed box, is a bar or roller 12, which is common to this form of seed drills, and is ordinarily employed for the purpose of elevating or lifting the hollow shares or plows, not shown, free from contact with the ground, the connection between the bar or roller and said shares or plows being generally made by means of chains, or equivalent devices. In order to effect the elevation of said shares or plows, it is necessary to turn the bar or roller, and to accomplish this a lever or handle 13 is employed, said lever or handle provided with a dog or pawl 14, adapted to engage a segmental rack, (as the lever is moved in the arc of a circle) shown in dotted lines in Fig. 1 as connected to one of the end pieces of the seed box.

The numeral 15 indicates a link, which is adapted to connect the bar or roller 12 with the clutch heads 4 and 5, and to act upon said clutch heads in a manner to throw the same in and out of mesh, when the roller or bar 12 is actuated for the purpose of raising or lowering the shares or plows. This link is provided with an elongated opening 16 through which the main axle 2 passes, and the upper end of the link is provided with an apertured arm or lug 17 which is adapted to be pivotally connected to an arm or lug 18 extending from bar or roller 12. It will be noticed that the link is interposed between the opposing faces of the clutch heads 4 and 5 and the lateral edge of the link adjacent to the head 5 is formed into an inclined or cammed surface 19, as clearly indicated in Fig. 4. It will be understood, however, that the same result may be obtained by providing the opposite edge with the inclination, or, in fact, both edges may be so inclined.

When the link is arranged in the position shown in Fig. 4 with reference to the clutch heads, the latter are in mesh, so that the rotation of the axle 2 will be imparted, through the medium of the sprocket chain 11, to the feeding cylinder shaft. Fig. 1 of the drawings shows the lever or handle 13 adjusted so as to throw the clutch heads out of gear, as seen in Fig. 3. The effect of this is that the axle 2 will run freely through the clutch head 5, and thus prevent rotary motion being imparted to the feeding cylinder shaft. It will also be understood that when the lever or handle is in the position just referred to the shares or plows are elevated clear of the ground. The effect of the coiled spring 8 of course is to throw the clutch head 5 into engagement with its companion head 4 when the handle or lever is adjusted to a position opposite to that shown in Fig. 1.

What I claim as my invention, and desire to secure by Letters Patent, is—

1. In a grain drill, or like machine, the combination of a seed-box, a feed cylinder shaft therein, having a sprocket wheel mounted thereon, a roller or bar, means for rotating the same, a main axle, a clutch-head fixed upon the axle, a spring pressed clutch-head loose thereon, the latter formed with sprocket teeth, a chain connecting said sprocket teeth with the sprocket wheel of the feeding cylinder shaft, and a connection between the roller or bar and the feeding cylinder, said connection constructed to normally hold the loose clutch in engagement with its companion fixed clutch, and to throw said loose clutch out of engagement, when the bar or roller is actuated, substantially as set forth.

2. In a grain drill, or like machine, the combination, of a seed-box, a feeding cylinder shaft therein having a sprocket wheel mounted thereon, a roller or bar, means for rotating the same, a main axle a clutch-head fast upon the axle, a spring-pressed clutch-head loose thereon, the latter formed with sprocket teeth, a chain connecting said sprocket teeth with the sprocket wheel of the feeding cylinder shaft, and a link having one end pivotally connected to the roller or bar and its opposite end formed into an elongated opening through which the shaft passes, the link inclined or cammed and constructed to normally hold the loose clutch in engagement with its companion fixed clutch, and to throw said loose clutch out of engagement, when the bar or roller is actuated, substantially as set forth.

In testimony whereof I affix my signature in presence of two witnesses.

SAMUEL W. ROWELL.

Witnesses:
W. H. STACY,
B. S. BARBER.